May 8, 1934.    H. FREY    1,958,084
FILING DEVICE
Filed Sept. 21, 1929    4 Sheets-Sheet 1
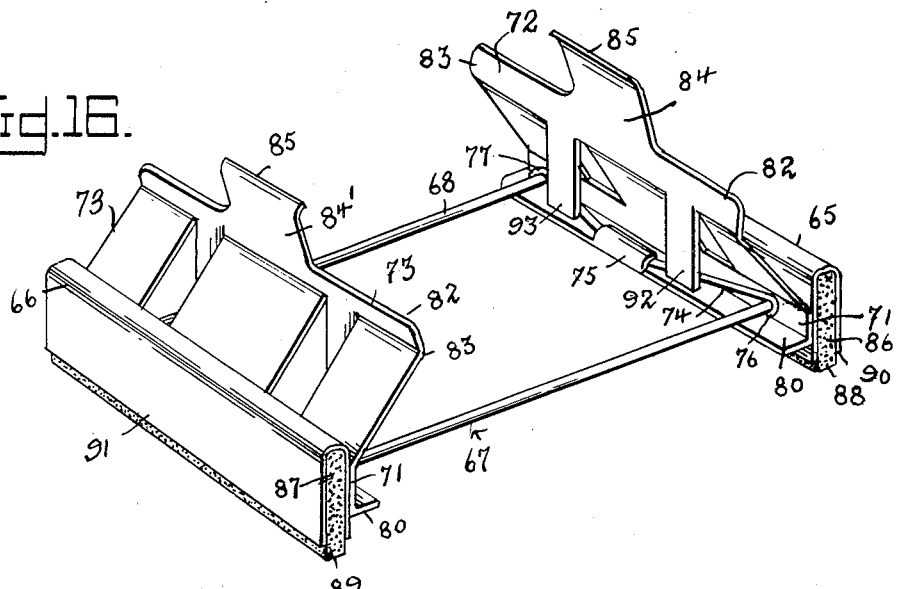
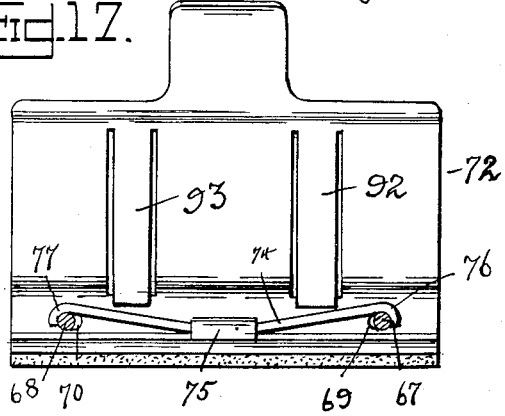
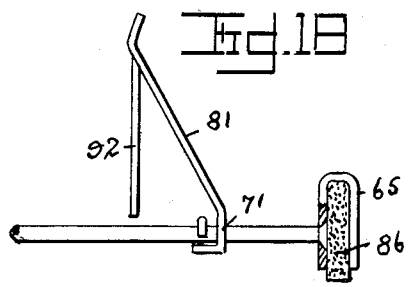
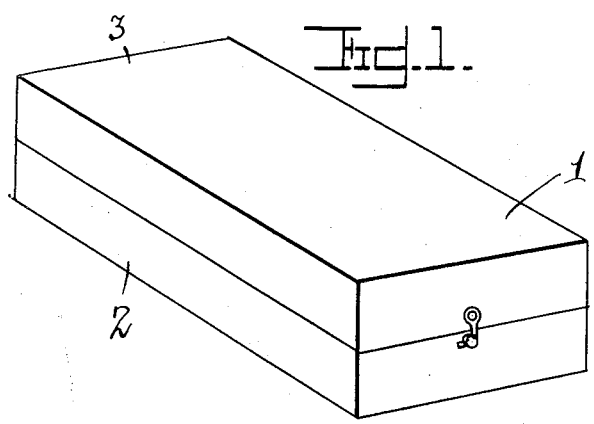
Inventor
Henry Frey May 8, 1934.                    H. FREY                    1,958,084
                              FILING DEVICE
                         Filed Sept. 21, 1929           4 Sheets-Sheet 2
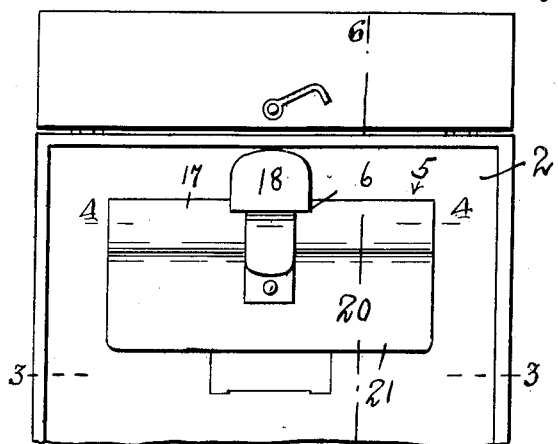
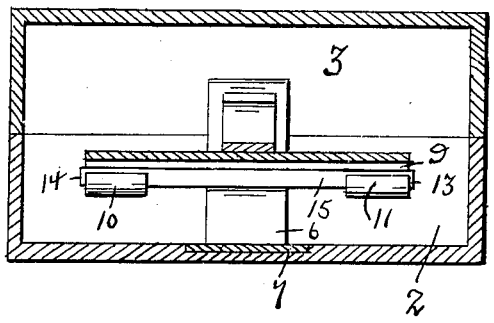
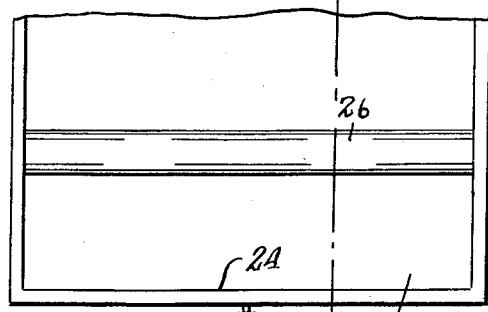
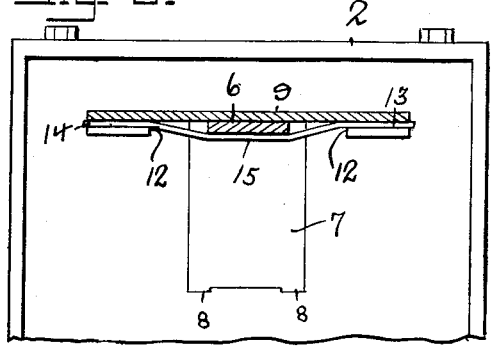
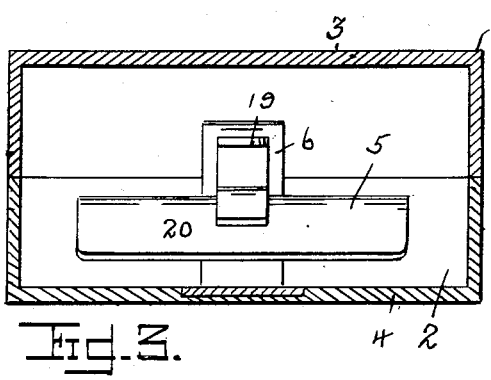
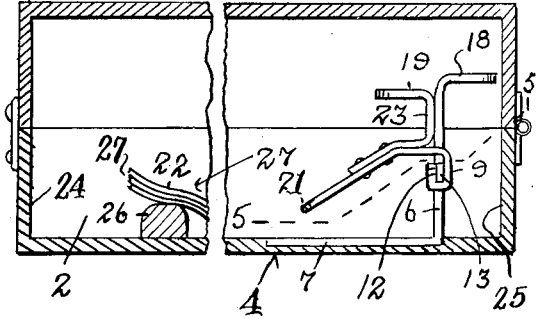
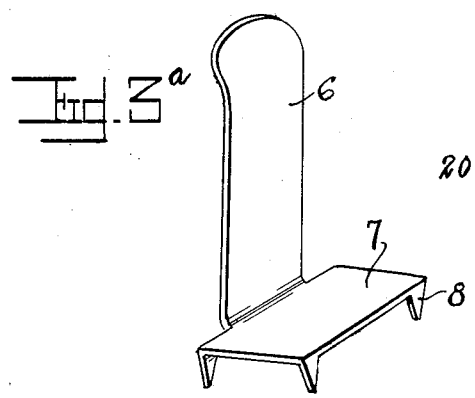
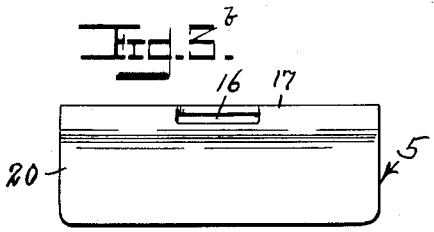
Inventor
Henry Frey

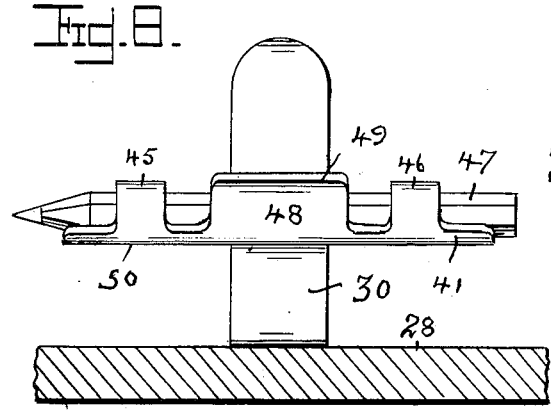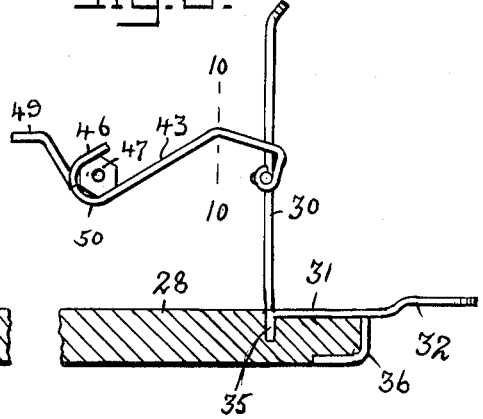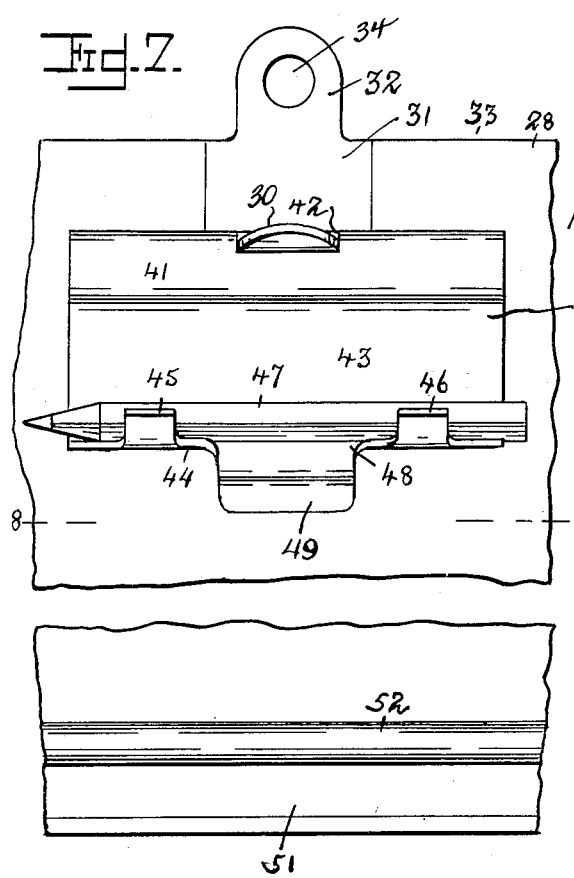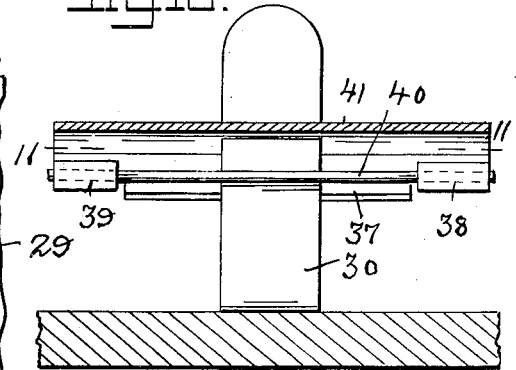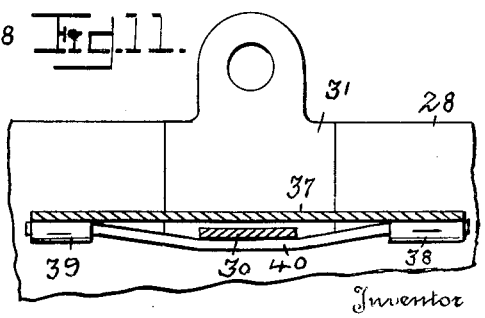
Inventor
Henry Frey

May 8, 1934.    H. FREY    1,958,084
FILING DEVICE
Filed Sept. 21, 1929    4 Sheets-Sheet 4
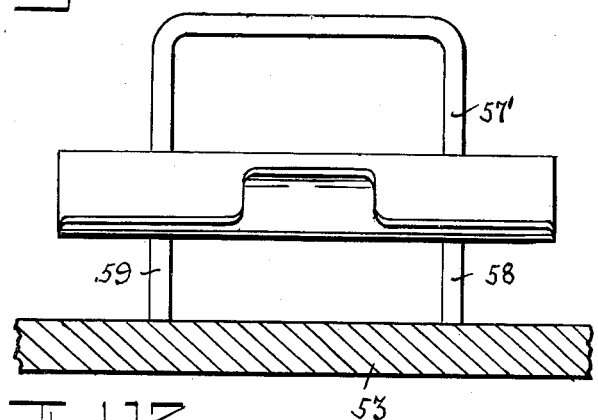
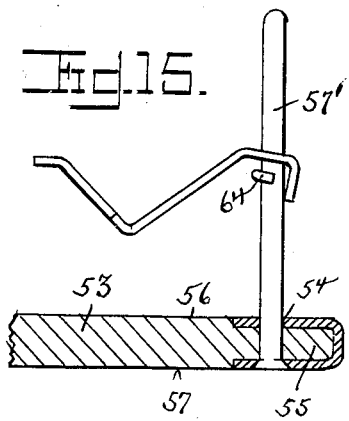
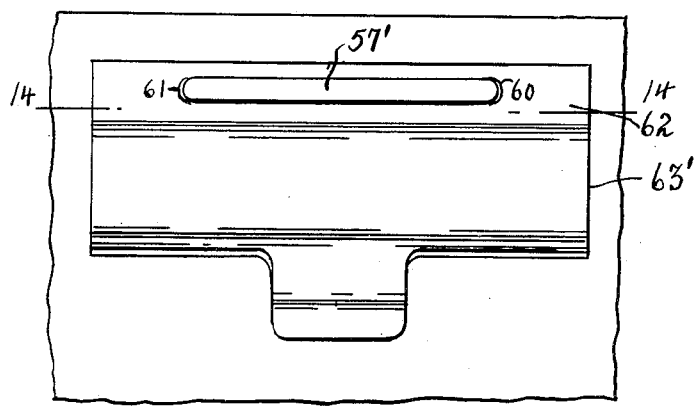
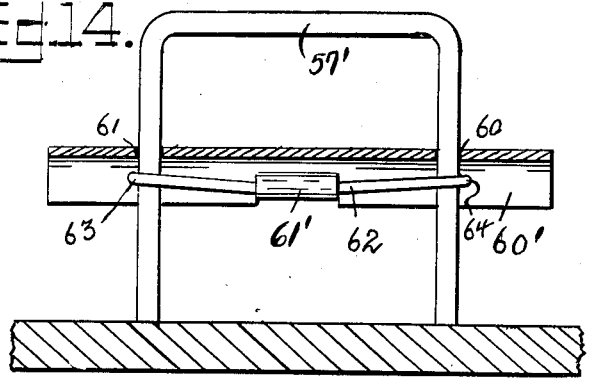
Inventor
Henry Frey Patented May 8, 1934

1,958,084

UNITED STATES PATENT OFFICE 1,958,084

FILING DEVICE

Henry Frey, Havana, Ill.

Application September 21, 1929, Serial No. 394,216

14 Claims. (Cl. 129—35)

This invention relates to improvements in filing devices and has for its object to provide in such a device a spring-controlled clamp whereby the papers filed will be held securely to the base thereof.

Another object of the invention is to provide a file for flat letter sheets or the like in which a means is provided whereby the sheets may readily be fanned at their free ends and easily fingered.

Another object of the invention is to provide in a filing device a clamp post and clamp jaws carried thereby and spring-controlled means whereby the jaws mays be instantly locked or unlocked.

Another object of the invention is to provide a device of the character described having a guide post and a spring-controlled jaw for operating upon said post.

A still further object of the invention is to provide in a device of the character described a pair of posts or runners and spring-controlled clamps operating upon said runners and means whereby the clamps may be normally held rigid but may be very easily moved through pressure upon the clamp members.

With the above and such other objects in view as may hereinafter more fully appear, I have invented the device shown in the accompanying drawings in which:

Figure 1 is a perspective view of a filing cabinet formed according to my invention;

Figure 2 is a plan view of a filing cabinet the top being shown open and the bottom being shown partly broken away;

Figure 3 is a section on line 3—3 of Figure 2;

Figure 3a is a detail perspective view of a clamp post;

Figure 3b is a detail top plan view of a clamp jaw;

Figure 4 is a section on line 4—4 of Figure 2;

Figure 5 is a section on line 5—5 of Figure 6;

Figure 6 is a section on line 6—6 of Figure 2;

Figure 7 is an elevational view of a modified form of invention, the parts being shown broken away;

Figure 8 is a section on line 8—8 thereof;

Figure 9 is an end elevation of Figure 8, with the base in section;

Figure 10 is a section on line 10—10 of Figure 9;

Figure 11 is a section on line 11—11 of Figure 10;

Figure 12 is an elevational view of a modification with the base in section;

Figure 13 is a plan view thereof;

Figure 14 is a section on line 14—14 of Figure 13 with parts of the clamp member broken away;

Figure 15 is a side elevational view of Figure 12 with the base in section.

Fig. 16 is a perspective view of another modified form of filing device embodying my invention.

Fig. 17 is a vertical transverse section therethrough looking toward one of the clamping members.

Fig. 18 is a side elevation of the portion of the device shown in Fig. 17, partly in section.

The herein described filing device embraces improvements over the structure of the filing device covered in my Patent Number 1,674,359, of June 19th, 1928.

Like reference characters indicate like parts throughout the following specification, and in the several views in the drawings in which 1 indicates a filing case, embracing the box 2, and a hinged lid 3, the bottom 4 of the box forming a base upon which sheets of paper are held by means of a clamp member 5, operating upon an upright bar or post 6, stamped from sheet metal and having an integral horizontal base 7, secured to the bottom 4 of the box by means of teeth 8, projecting from each corner of the plate 7, and through the member 4, to which said teeth are clinched whereby the upright 6 is rigidly supported upon said bottom 4. The clamp member or jaw 5 is stamped from sheet metal and is provided with a vertical flange 9, the extreme ends 10 and 11 of which are extended and returned inwardly upon said flange 9 to form recesses 12 to receive the ends 13 and 14 of a leaf spring 15, between which and the vertical flange 9, the member 6 projects, there being provided a slot 16 in the horizontal wall 17 of the member 5, through which the member 6 operates. Said upright 6 is provided with a right angular free end or head 18, which acts as a stop to limit the upward movement of the jaw 5, and also as a finger rest for use of the operator when raising the member 5 by means of a hook 19, fixed to said member 5. The jaw 5 has projecting from its horizontal portion 17, downwardly inclined portion 20, the edge 21 of which rests normally on or above the base 7, between which base and which edge 21 sheets of paper 22 are held clamped when the member 5 is pressed down upon said sheets the action of the sheets 22 upon the edge 21 tending to force said edge up which action causes the flange 9, the spring 15, and the vertical wall 23, of the hook 19, to frictionally press against the member 6 whereby the clamp binds upon said member and maintains its lowermost position.

Adjacent the side 24 of the box 2, opposite to the side 25 thereof, adjacent which the binder clamp is attached, is a longitudinal rib 26, upon which the edges 27 of the sheets 22 rest, in order that when the sheets are pressed down, inwardly of the member 26, said edges 27 will be feathered and raised to a substantially vertical position whereby said edges will be presented to the user in order that anyone of the stack of sheets 22 may be easily taken hold of.

In Figures 7 to 11 I show a modification of the invention in which 28 is a filing board, including a clamp jaw 29 slidably mounted upon the upright 30, said upright having a right angular base 31, with an extension 32 projecting beyond the edge 33 of the member 28, and having an eye 34 by means of which it may be hung upon a nail. The member 31 has projecting teeth 35, bent down from the inner ends thereof, and clamp members 36 projecting down from the outer portion thereof and bent around the edge 33 of the board 28 and counter-sunk into the bottom of said board whereby the said member 30 will be rigidly held to said board. The member 29 is provided with a vertical flange 37 having returned ends 38 and 39 to receive the ends of the wire spring 40 between which and the flange 37 the member 30 projects, the horizontal portion 41 having a slot 42 to receive said member 30. The inclined terminal 43 of the member 29 has a right angular flange 44, extending across its lower edge from which a pair of fingers 45 and 46 are returned over the member 43, to form holders for a pencil 47. Also projecting straight out from the flange 41, at the center thereof, is a tongue 48, having its end terminating in a normally horizontal terminal 49. In this form of the invention, the action of which is similar to that in the form of Figure 2, the spring 40 tends to hold the corner 50 secure upon papers filed on the said member 28. However, when the finger of the operator is pressed upon the horizontal terminal 49, the clamp member 29 will be released from its binding action and may be forced upwardly upon the member 30, through continued pressure upon said terminal 49. Adjacent the lower edge 51 of the board 28, and transversely thereof, is a rib 52, upon which the edges of the sheets bound upon the board 28 may be feathered.

A modification of the form of device just described is illustrated in Figures 12 to 15, in which the board or base 53 has a U-shaped metal, reinforcement 54 bent over the edge 55 thereof, and counter-sunk flush with the surfaces 56 and 57 of the board 53. Supported, by means of the member 54 is an inverted U-shaped support 57', the vertical arms 58 and 59 of which project through apertures 60 and 61 in the horizontal wall 62 of the clamp member 63', the construction of which is otherwise substantially the same as the clamp member 29 of Figure 7, except that its vertical rear flange 60' is provided with a centrally disposed tongue 61', rolled over the central portion of the wire spring 62 the terminals 63 and 64 of which are bent around the arms 58 and 59, clampingly engaging the same.

In Figures 16, 17, and 18 I show a further modification of the invention in which a pair of inverted U-shaped metal supports 65 and 66 are connected by spaced apart horizontally disposed parallel wire bars 67 and 68 which project through openings 69 and 70 in the vertical walls 71 of the clamp members 72 and 73, which are held in upright position by means of springs 74, carried centrally by the returned central portions 75 of the horizontal flanges 80 of said members 72 and 73, the terminals 76 and 77 of said spring 74 being hooked over the bars 67 and 68 the action of which holds the flanges 80 normally against the under-side of said bars causing frictional engagement between the clamp jaws 72 and 73 and the rods 67 and 68. The members 72 and 73 are each provided with inclined walls 81 extending inwardly from the upper edge of the wall 71, and having angularly disposed edges 82, forming transverse corners 83 which are adapted to press upon cards supported upon the bars 67 and 68, the pressure of said cards upon said corners 83 having a tendency to force the jaw members to still further bind upon the bars 67 and 68, to prevent accidental movement thereof on said bars.

Projecting centrally from the flanges 82 and rearwardly inclined, are tongues or finger pieces 84 and 84' having inwardly curved terminals 85, in order that the operator may engage said members 84 and 84' and press the same toward one another against the action of the springs 74 which will permit the said members 72 and 73 to be thrown toward one another and against cards in the file. By the manipulation of the same tongues the clamp members 72 and 73 may be moved away from one another and the cards therebetween.

Secured within the U-members 65 and 66 are felts 86 and 87 the lower edges 88 and 89 of which project below the lower edges 90 and 91 of said U-members, whereby these filing devices may be removed from their boxes and placed upon desks or other highly polished surfaces without danger of scratching or otherwise marring the same. Struck out from the inclined walls 81 of the members 72 and 73 are vertically disposed arms 92 and 93 which are formed in the shape of fingers to bear flat against the surfaces of cards carried in the file whereby said cards will be held in upright position and not permitted to slide under the inclined walls 81.

Through continual use of the device the tension of the spring 74 will gradually weaken making it necessary to substitute a new spring therefor, which may readily be done through removing the old spring and replacing a new one in the spring holder 75 therefor.

Having thus described my device, I claim:

1. A filing device having a supporting element, a clamping element slidably mounted thereon, said clamping element having a depending part extending parallel with the supporting element and transversely thereof, and spring means engaging the supporting element and operating to draw said part in frictional engagement with the supporting element for holding the clamping element against sliding movement on said supporting element.

2. A filing device having a supporting element, a clamping element slidably mounted on the supporting element and having a portion arranged in parallel relation therewith, and an elongated spring carried by one of said elements and extending across the supporting element opposite the part of the clamping element parallel therewith, for drawing said part into frictional and binding engagement with the supporting element..

3. A filing device embodying a supporting element, a clamping element slidably mounted on the supporting element and having a portion disposed transversely thereof and extending in parallel relation therewith, and an elongated spring member extending transversely of the supporting element and substantially parallel with said parallel portion of the clamping element, said spring being secured to the clamping element on opposite sides of the supporting element and bearing intermediately on the latter to frictionally connect said elements together.

4. A filing device comprising a support, a clamping member slidably mounted on said support and having a flange portion disposed transversely of and extending parallel with the support, and a spring extending transversely of the support and carried by said flange portion of the clamping member for frictionally securing the same against sliding movement on the support.

5. A filing device embodying an upright support, a clamping element vertically slidable on the support and having a flange portion arranged at right angles to the clamping element and transversely thereof and lying on one side of said support, and a spring arranged on the opposite side of said support transversely thereof in parallel relation to said flange portion and bearing on the opposite side of said support to frictionally hold the clamping member at a desired elevation on the support.

6. A filing device comprising a support, a clamping member slidably mounted on the support and having a flange portion disposed at right angles to said clamping member and lying on one side of said support, and a linear spring extending substantially parallel with said flange portion of the clamping member and across the opposite side of the support from the flange portion and operating to hold the clamping member in frictional engagement with the support.

7. A filing device comprising spaced parallel supporting members, a clamping element slidably mounted on said supporting members and having a depending transverse flange disposed on one side of said supporting members, and a linear spring intermediately secured to the flange portion of the clamping element and bearing at its ends on the supporting members and operating to draw said flange portion in frictional engagement with said supporting members.

8. A filing device comprising a support having spaced post portions, a clamping device slidably and tiltably mounted on said post portions of the support and provided with a flange extending transversely of the support and on one side of said post portions thereof, and a linear spring intermediately secured to said flange portion of the clamping member and bearing at its ends against the post portions of the support at the opposite sides thereof from the flange and operating to normally draw said flange portion in binding engagement with the post portions and to permit yielding tilting motion of the clamping member on the post portions.

9. In a filing device, a supporting element, a clamping member slidably and tiltably mounted on the supporting element and having flange portions normally arranged at right angles to each other and respectively at right angles to and parallel with the supporting element, and a spring connection between the supporting element and the flange portion of the clamping member parallel therewith for holding the clamping member in frictional engagement with the supporting element while permitting yielding tilting motion thereof.

10. In a filing device, a supporting element, a clamping member slidably and tiltably mounted on said supporting element and having flange portions arranged at right angles to each other, one of said flange portions being disposed at right angles to and the other parallel with the supporting element, and a spring extending transversely of the supporting element and intermediately secured to the parallel flange portion of the clamping member and having its ends arranged to bear against the supporting element to frictionally hold the parallel flange portion in engagement therewith while permitting yielding tilting motion of the clamping member on the support.

11. A filing device comprising a supporting member, a clamping member embodying a downwardly and forwardly inclined body portion having at its rear a horizontal portion terminating in a vertical flange, said horizontal portion being slidably engaged with the supporting member and the vertical flange being arranged to lie parallel with the supporting member in rear thereof, a spring associated with said vertical flange and engaging the supporting member to hold the clamping member in adjustment on the supporting member, the forward edge of the body of the clamping member being upturned and provided with an angularly bent finger-piece of less width than said body portion of the clamping member.

12. A filing device having a support, a clamping member mounted on said support for engaging and holding sheets clamped against the base in rear of their free edges, and a strip of material forming a ridge upon the base in advance of the transverse center of the sheets and adjacent to and beneath the free edges of the sheets beyond the clamping point of the clamping member to raise and fan said edges under the clamping action of said clamping member, for conveniently grasping and fingering them.

13. In a filing device, a base, a post, a horizontal plate supporting the post and extending forwardly therefrom and secured to the base, and a clamping member slidably mounted on the post and bearing against one side thereof and carrying a friction spring bearing against the opposite sides thereof, said clamping member extending from the post forwardly over the horizontal plate and adapted to engage material to be clamped at a point between the post and forward edge of the plate and rearwardly of said edge.

14. In a filing device, a guide post, and a clamping member mounted thereon, said guide post being constructed of a single piece of metal and having an upright portion slidably supporting the clamping member and a bottom portion projecting forwardly at right angles from the upright portion and provided with claws for fastening it to a base, the clamping member having a friction spring engaging with said upright portion of the post and being provided with a clamping portion for clamping material against said bottom portion of the post between the upright portion and forward edge of the bottom portion and in rear of said edge.

HENRY FREY.